United States Patent
Maruyama et al.

(10) Patent No.: US 11,220,029 B2
(45) Date of Patent: Jan. 11, 2022

(54) RESIN MOLDING AND METHOD FOR PRODUCING THE SAME

(71) Applicant: TOYOTA BOSHOKU KABUSHIKI KAISHA, Aichi-ken (JP)

(72) Inventors: Shintaro Maruyama, Aichi-ken (JP); Masanori Hashiba, Gifu-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 332 days.

(21) Appl. No.: 15/949,803

(22) Filed: Apr. 10, 2018

(65) Prior Publication Data
US 2018/0297251 A1 Oct. 18, 2018

(51) Int. Cl.
*B29C 45/14* (2006.01)
*B29C 43/02* (2006.01)
(Continued)

(52) U.S. Cl.
CPC ........ *B29C 45/14* (2013.01); *B29C 45/14786* (2013.01); *B60R 13/02* (2013.01);
(Continued)

(58) Field of Classification Search
CPC .............. B29C 45/14; B29C 45/14073; B29C 2045/14081; B29C 2045/1409;
(Continued)

(56) References Cited

U.S. PATENT DOCUMENTS

2007/0224382 A1* 9/2007 Cowelchuk ............... B32B 7/02 428/43
2011/0008566 A1 1/2011 Okano et al.
(Continued)

FOREIGN PATENT DOCUMENTS

CN 101835596 A 9/2010
CN 102725118 A 10/2012
(Continued)

OTHER PUBLICATIONS

U.S. Appl. No. 15/950,873, filed Apr. 11, 2018, Kamiya.
(Continued)

*Primary Examiner* — Maria V Ewald
*Assistant Examiner* — Ethan Weydemeyer
(74) *Attorney, Agent, or Firm* — Greenblum & Bernstein, P.L.C.

(57) ABSTRACT

To provide a resin molding and a method for producing the same.

A resin molding includes a plate-like substrate including reinforcing fibers and a first thermoplastic resin binding the reinforcing fibers to each other, and an extension part that is constituted of an injection-molded member and is extended from an end surface of the substrate along the plate face direction of the substrate. It is preferred that the reinforcing fibers be plant fibers, such as kenaf. It is preferred that the substrate and the extension part be connected flush to each other on, of the one surface and the other surface of the connection part of the substrate and the extension part, at least the side of one surface. Moreover, the extension part may further be provided with a plate-like part that constitutes an outer edge part of the resin molding and forms a shape involute toward the other surface. The method for producing a resin molding includes a shaping step of shaping the substrate and an extension part formation step of forming the extension part by injection-molding.

7 Claims, 2 Drawing Sheets

(51) Int. Cl.
*B60R 13/02* (2006.01)
*B29L 31/30* (2006.01)
*B29K 101/12* (2006.01)
*B29K 201/00* (2006.01)
*B29K 311/10* (2006.01)

(52) U.S. Cl.
CPC .......... *B29C 43/02* (2013.01); *B29K 2101/12* (2013.01); *B29K 2201/00* (2013.01); *B29K 2311/10* (2013.01); *B29L 2031/3041* (2013.01); *B60R 13/0212* (2013.01); *B60R 13/0243* (2013.01); *Y10T 428/24628* (2015.01)

(58) Field of Classification Search
CPC .......... B29C 2045/14098; B29C 2045/14106; B29C 2045/14114; B29C 2045/14122; B29C 2045/14131; B29C 2045/14139; B29C 2045/14147; B29C 2045/14155; B29C 2045/14163; B29C 2045/14172; B29C 45/14467; B29C 45/14475; B29C 2045/14483; B29C 45/14491; B29C 2045/145; B29C 45/14508; B29C 2045/14516; B29C 2045/14524; B29C 2045/14532; B29C 2045/1454; B29C 45/14786; B29L 2031/3041; B60R 13/0212; B60R 13/0243; B60R 3/02; B29K 2101/12; B29K 2201/00; B29K 2311/10; Y10T 428/24628
See application file for complete search history.

(56) References Cited

U.S. PATENT DOCUMENTS

| | | | |
|---|---|---|---|
| 2012/0282424 A1 | 11/2012 | Tabeya et al. | |
| 2013/0040076 A1* | 2/2013 | Jones | B60R 13/02 428/12 |
| 2013/0108835 A1* | 5/2013 | Kamiya | B29C 45/1418 428/170 |
| 2016/0221274 A1 | 8/2016 | Ono et al. | |

FOREIGN PATENT DOCUMENTS

| | | |
|---|---|---|
| CN | 105531101 A | 4/2016 |
| DE | 10101527 A | 8/2002 |
| DE | 202007001776 U | 7/2008 |
| JP | 2000108205 A | 4/2000 |
| JP | 2002283386 A | 10/2002 |
| JP | 2013075447 A | 4/2013 |
| JP | 2013-091287 | 5/2013 |

OTHER PUBLICATIONS

U.S. Appl. No. 15/949,725, filed Apr. 10, 2018, Kamiya et al.
Chinese Office Action dated Nov. 4, 2019 in the corresponding Chinese Application No. 201810330812.0 along with the English machine translation.
Office Action issued in Germany Counterpart Patent Appl. No. 102018108674.1, dated Mar. 26, 2020, along with an English translation thereof.
Office Action issued in counterpart Japan Patent Appl. No. 2017-080755, dated Oct. 20, 2020, along with an English translation thereof.

* cited by examiner

RESIN MOLDING AND METHOD FOR PRODUCING THE SAME

CROSS-REFERENCE TO RELATED APPLICATIONS

The present application claims priority under 35 U.S.C. § 119 of Japanese Application No. 2017-80755 filed on Apr. 14, 2017, the disclosure of which is expressly incorporated by reference herein in its entirety.

BACKGROUND

1. Technical Field

The present invention relates to a resin molding and a method for producing the same. Particularly, the present invention relates to a resin molding having an extension part extended from an end surface of a plate-like substrate made of a thermoplastic resin containing reinforcing fibers along a plate face direction, wherein an aesthetic under shape part may be formed by the extension part, and a method for producing the same.

2. Related Art

Heretofore, an under shape structure for attaching the internal material to a vehicle panel, such as a retainer bracket, a boss, or a runner, is attached to a substrate for vehicle interior constituted of a resin molding, on the rear surface thereof, which is to be located opposite from the compartment (see FIG. 1). Such an under shape structure has been provided by injection-molding a thermoplastic resin to the rear surface of a substrate simultaneously with press-molding of the substrate (see, for example, JP-A-2013-91287). The molded structure disclosed in JP-A-2013-91287 is exemplified therein by a door trim in which a bracket joined with a trim board is molded by injecting a molten resin against the trim board.

SUMMARY

As described above, various types of under shape structure are attached on a rear surface of a press-molded substrate for vehicle interior, by injection-molding. A substrate molded using a thermoplastic resin containing reinforcing fibers such as plant fibers is usually formed entirely in a plate-like shape. Therefore, it is possible to attach an under shape structure on its surface (rear surface), but no attempt has ever been made to provide a resin molded part made of only a thermoplastic resin containing no reinforcing fibers to an end surface of the periphery of a substrate along the plate face direction of the substrate. Accordingly, when a substrate has, on an outer edge part thereof, an aesthetic under shape part, the substrate and the aesthetic under shape part, that is, the entire body of a resin molding is formed by injection-molding a thermoplastic resin.

The present invention has been devised in view of the above-described conventional technologies and an object thereof is to provide a resin molding yielded by inserting a heated sheet for molding a plate-like substrate into a mold, press-molding the substrate and simultaneously injecting a resin composed only of a thermoplastic resin containing no reinforcing fibers against a side surface that will become an end surface of the substrate, and thereby extending an extension part along the plate face direction of the substrate, and a method for producing the same.

The present invention is as follows.

1. A resin molding comprising:
   a plate-like substrate comprising reinforcing fibers and a first thermoplastic resin binding the reinforcing fibers to each other; and
   an extension part that is constituted of an injection-molded member and is extended from an end surface of the substrate along the plate face direction of the substrate.
2. The resin molding according to claim 1, wherein the reinforcing fibers are plant fibers.
3. The resin molding according to claim 1, wherein the substrate and the extension part are connected flush to each other on, of one surface and another surface of the connection part of the substrate and the extension part, the side of the one surface.
4. The resin molding according to claim 1, wherein the reinforcing fibers are plant fibers, and wherein the substrate and the extension part are connected flush to each other on, of one surface and another surface of the connection part of the substrate and the extension part, the side of the one surface.
5. The resin molding according to claim 1, wherein the substrate and the extension part are connected flush to each other on, of one surface and another surface of the connection part of the substrate and the extension part, the side of the one surface, and wherein the extension part is equipped with a plate-like part further extending from the extension part, wherein the plate-like part constitutes an outer edge part of the resin molding and forms a shape involute toward the side of the other surface.
6. The resin molding according to claim 1, wherein the reinforcing fibers are plant fibers, wherein the substrate and the extension part are connected flush to each other on, of one surface and another surface of the connection part of the substrate and the extension part, the side of the one surface, and wherein the extension part is equipped with a plate-like part further extending from the extension part, wherein the plate-like part constitutes an outer edge part of the resin molding and forms a shape involute toward the side of the other surface.
7. The resin molding according to claim 1, wherein the substrate and the extension part are connected flush to each other on, of one surface and another surface of the connection part of the substrate and the extension part, the side of the one surface, wherein the extension part is equipped with a plate-like part further extending from the extension part, wherein the plate-like part constitutes an outer edge part of the resin molding and forms a shape involute toward the side of the other surface, and wherein the resin molding has a rib that is arranged on the side of the other surface from the substrate to the plate-like part and stands approximately perpendicularly to the plate face direction of the substrate, and wherein the rib is a part of the injection-molded member.
8. The resin molding according to claim 1, wherein the reinforcing fibers are plant fibers, wherein the substrate and the extension part are connected flush to each other on, of one surface and another surface of the connection part of the substrate and the extension part, the side of the one surface, wherein the extension part is equipped with a plate-like part further extending from the extension part, wherein the plate-like part constitutes an outer edge part of the resin molding and forms a shape involute toward the side of the other surface, and wherein the resin molding has a rib that is arranged on the side of the other surface from the substrate to the plate-like part and stands approximately perpendicularly to the plate face direction of the substrate, and wherein the rib is a part of the injection-molded member.

9. The resin molding according to any one of claims 1 to 8, wherein the first thermoplastic resin and a second thermoplastic resin contained in the injection-molded member are the same type of thermoplastic resin.

10. A method for producing a resin molding according to any one of claims 1 to 9, comprising:

a shaping step of shaping the substrate; and an extension part formation step of forming the extension part by injection-molding.

The resin molding of the present invention includes a plate-like substrate including a first thermoplastic resin binding reinforcing fibers to each other, and an extension part that is constituted of an injection-molded member and is extended from an end surface of the substrate along the plate face direction thereof. Thanks to such a configuration, unlike conventional substrates having no extension part, a step of cutting and removing a periphery in order to remove burrs formed at an outer edge part becomes unnecessary and no edge strip is produced, so that the raw material yield rate is improved. Moreover, it is possible to attach an under shape structure such as a retainer bracket, a boss, and a runner to a surfaces (rear surface) of a substrate by injection-molding during the press-molding of the substrate, and at the same time, it is also possible to form an aesthetic under shape part that is connected to the extension part. Resin moldings having an aesthetic under shape part connected to an end surface of a substrate have conventionally been formed by injection-molding their entire body from a thermoplastic resin; however, substrates made of only thermoplastic resin have a problem that they are heavy as compared to substrates using reinforcing fibers and thermoplastic resin and resulting resin moldings will be large in weight as a whole. On the other hand, the resin molding of the present invention is advantageous in terms of weight reduction especially when the resin molding has an aesthetic under shape part because it is a substrate using reinforcing fibers and a thermoplastic resin.

The case where the reinforcing fibers are plant fibers is preferable in terms of environmental clean-up, such as reduction in carbon dioxide emissions or fixing of carbon dioxide. Especially, plant resources that grow fast and absorb much carbon dioxide, such as kenaf, are useful for a resin molding made of a composite material with resin.

Moreover, when the substrate and the extension part are connected flush to each other on, of the one surface and the other surface of the connection part of the substrate and the extension part, at least the side of the one surface, a product with superior appearance can be afforded by determining the flush surface as an aesthetic surface when being used as an interior material for vehicles, an interior material for buildings, or the like.

In the case where the resin molding has a plate-like part further extending from the extension part, wherein the plate-like part constitutes the outer edge part of the resin molding and forms a shape involute toward the other surface, the outer edge part having the involute shape can serve as an aesthetic under shape part when the resin molding is, for example, an interior material for vehicles, such as a door trim or a roof trim.

Moreover, in the case where the resin molding has a rib that is arranged on the side of the other surface from the substrate to the plate-like part and that stands approximately perpendicularly to the plate face direction of the substrate wherein the rib is a part of the injection-molded member, when the resin molding is, for example, an interior material such as a door trim, a roof trim or the like for vehicles, the strength can be enhanced especially at an outer edge part thereof, so that a prescribed shape can be maintained and distortion or the like at the outer edge part can be suppressed upon coming into contact with other objects.

When the first thermoplastic resin and the second thermoplastic resin contained in the injection-molded member are the same type of thermoplastic resin, a resin molding in which the substrate and the extension part are joined together firmly can be formed.

According to the method for producing a resin molding of the present invention, a resin molding having a prescribed shape and prescribed dimensions can be produced easily via a simple process by forming a substrate shaped in a prescribed planar shape by press-molding or the like, and at the same time, forming an extension part by injection-molding.

DETAILED DESCRIPTION

The present invention is hereafter described in detail with reference to drawings.

The particulars shown herein are by way of examples and for purposes of illustrative discussion of the embodiments of the present invention only and are presented for the purpose of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings, making apparent to those skilled in the art how some forms of the present invention may be embodied in practice.

[1] Resin Molding

Figure 1:
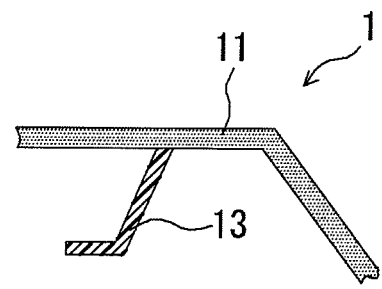
FIG. 1 is a schematic cross-sectional view of a part of a resin molding composed of a substrate and an under shape structure attached to a surface (the other surface) of the substrate.
Figure 2:
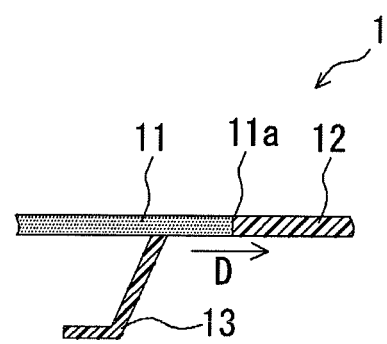
FIG. 2 is a schematic cross-sectional view of a resin molding in which the substrate thereof is in a plate-like shape and has an end surface from which an extension part is extended.

The resin molding 1 of the present invention includes a plate-like substrate 11 including reinforcing fibers and a first thermoplastic resin binding the reinforcing fibers to each other, and an extension part 12 that is constituted of an injection-molded member and that is extended from an end surface 11a of the substrate along the plate face direction D of the substrate 11 (see FIG. 2). The extension part 12 formed by injection-molding is extended, at least at a periphery of the substrate 11, in the same plane direction (the plate face direction D).

The substrate 11 is a plate-like body including reinforcing fibers and a first thermoplastic resin binding the reinforcing fibers to each other. The reinforcing fibers are not particularly limited and plant fibers, inorganic fibers, animal fibers, and the like can be used, and plant fibers are particularly preferred. Plant fibers are preferred from an environmental point of view, and they usually have a small specific gravity as compared to thermoplastic resin and can reduce the weight of resin moldings. Examples of the plant fibers include kenaf, hemp, cotton, palm fiber, and coconut fiber, and kenaf, which is a fast growing annual grass having a woody stem, is particularly preferred. Examples of the inorganic fibers include glass fibers, carbon fibers, metal fibers, etc. Such plant fibers and inorganic fibers are usually used in the form of long fibers that have been split.

Kenaf, which is used as a particularly preferable reinforcing fiber, is a fast growing annual grass having a woody stem and is a plant classified into malvaceae. The kenaf includes *hibiscus cannabinus* and *hibiscus sabdariffa* in scientific names, and further includes Indian hemp, Cuban kenaf, kenaf, Tai kenaf, mesta, bimli hemp, ambary hemp, Bombay hemp, etc. in common names.

The ratio of the reinforcing fibers to the first thermoplastic resin is not particularly limited and can be suitably set in accordance with the type, the application, etc. of the resin molding. For example, when reinforcing fibers are plant fibers such as kenaf, the proportion of the plant fibers can be set to 30 to 60% by mass, and especially 40 to 50% by mass where the total amount of the plant fibers and the first thermoplastic resin is 100% by mass.

The substrate 1 including reinforcing fibers and a first thermoplastic resin binding the reinforcing fibers to each other is molded as a plate-like body. And when the resin molding is an interior material for vehicles, such as a door trim or a roof trim, an under shape structure 13 made of a thermoplastic resin for attaching to a vehicle panel, such as a retainer bracket, a boss or a runner, is formed by injection-molding on a surface (rear surface) of the plate-like body. However, no molded part has been provided by injecting a thermoplastic resin against an end surface 11a of a substrate 11 molded in the form of a plate-like body, along directions coplanar with the plate-like body, that is, the plate face direction D of the plate-like body.

In the present invention, an extension part 12 constituted of an injection-molded member is provided on an end surface 11a of a substrate 11 along the plate face direction D of the substrate 11 by injecting a second thermoplastic resin. In this case, in the vicinity of the end surface 11a of the substrate 11, the second thermoplastic resin injected may enter the substrate 11 or reinforcing fibers may enter the extension part 12 depending on the injection pressure, which, however, does not cause any particular problems.

On the other hand, the extension part 12 made of the second thermoplastic resin is greater in thermal shrinkage as compared to the substrate 11 made of the first thermoplastic resin containing the reinforcing fibers and, therefore, it may shrink during a cooling process after the injection-molding. As a result, a difference in level may be produced between the end surface 11a of the substrate 11 and the extension part 12.

Therefore, it is preferred that the substrate 11 and the extension part 12 be connected flush to each other on, of the one surface and the other surface of the connection part of the substrate 11 and the extension part 12, at least the side of the one surface. Thus, the resin molding 1 in which the substrate 11 and the extension part 12 are connected flush to each other can be formed by a molding method involving use of a mold having a prescribed cavity, etc. Moreover, it is also possible to adopt a configuration in which the substrate 11 and the extension part 12 are connected flush to each other also on the side of the other surface of the connection part of the substrate 11 and the extension part 12. However, also in view of the fact that interior materials for vehicles and the like will require a mold with a more complicated structure, it is not particularly needed to connect them flush together also on a non-aesthetic surface (a surface which will be located on the vehicle panel side for interior materials for vehicles).

Figure 3:
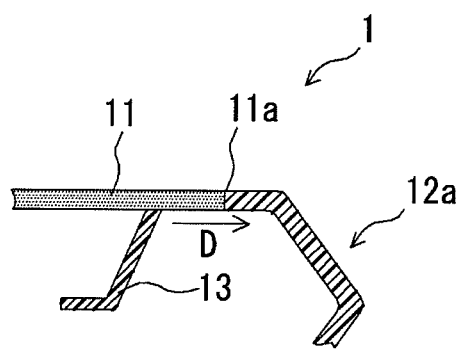
FIG. 3 is a schematic cross-sectional view of a resin molding in which the extension part depicted in FIG. 2 has a plate-like part and an aesthetic under shape part is formed of the plate-like part.
Figure 4:
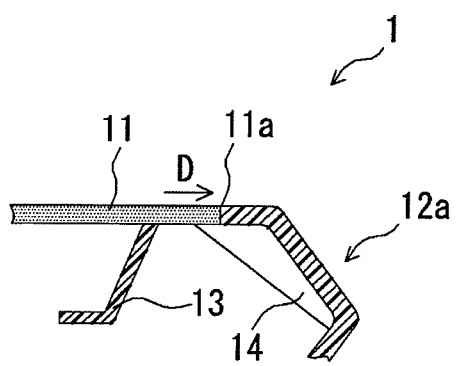
FIG. 4 is a schematic cross-sectional view of a resin molding provided with a rib extending from the substrate to the aesthetic under shape part of FIG. 3.

Moreover, while the extension part 12 extends from the end surface 11a of the plate-like substrate 11 along the plate face direction D, the extension part 12 may have a plate-like part further extending from the extension part 12 as a part of the injection-molded member. Although the plate-like part may be formed in any shape, the plate-like part may be an aesthetic under shape part 12a (see FIG. 3) when the resin molding 1 is an interior material for vehicles or the like. For example, the plate-like part can be configured to constitute an outer edge part of the resin molding 1 and form a shape involute toward the other surface of the connection part of the substrate 11 and the extension part 12 on which surface the substrate and the extension part may or may not be connected flush to each other, and an aesthetic under shape part 12a can thereby be formed.

Moreover, when the resin molding 1 is an interior material for vehicles or the like and the aesthetic under shape part 12a has been formed, the resin molding 1 may have a rib 14 that is arranged on the side of the other surface that will not be an aesthetic surface from the substrate 11 to the plate-like part and that stands almost perpendicularly to the plate face direction of the substrate 11. The rib 14 can be formed as a part of an injection-molded member when injecting a second thermoplastic resin to be used for the formation of a plate-like part that is allowed to serve as the extension part 12 and the aesthetic under shape part 12a. By forming a rib 14 in such a manner, an outer edge part of the resin molding 1 can be strengthened and a prescribed aesthetic surface shape can be maintained when the resin molding 1 is an interior material for vehicles or the like, and an interior material which is not distorted easily upon coming into contact with other articles, etc. can be made.

The substrate 11 is formed using a first thermoplastic resin. The injection-molded member to constitute the extension part 12 is formed using a second thermoplastic resin. Although the first thermoplastic resin and the second thermoplastic resin may be the same type of resin or alternatively may be different types of resin, it is preferred that they be the same type of resin in order to sufficiently and easily join an end surface 12a of the substrates 11 with an end surface of the extension part 12 constituted of the injection-molded member. The same type of resin referred to herein means that the main monomers to constitute the respective resins (polymers) are the same, and it may be a resin made of a homopolymer composed of the monomer or alternatively may be a resin made of a copolymer in which a prescribed amount of other monomers is copolymerized.

The first and second thermoplastic resins are not particularly limited and examples thereof include polyolefin resins, such as polypropylene and polyethylene, acrylic resins such as polymethyl acrylate and polymethyl methacrylate, polyamide resins, such as Nylon-6 and Nylon-66, and polyester resins, such as polyethylene terephthalate and polybutylene terephthalate. Of the various types of resins, the polyolefin resins, especially, polypropylene resins such as polypropylene homopolymers, are preferred. These thermoplastic resins are each blended with and caused to contain a prescribed amount of additive, etc. usually used for such types of resins, such as antioxidants, UV absorbers, lubricants, and antistatic agents, as necessary.

The resin molding 1 of the present invention can be used in a wide variety of product fields, such as vehicle-related fields and building-related fields. In the vehicle-related field, it is suitable as interior materials, exterior materials, structural materials, etc. of vehicles. For example, it is used as a door trim, a pillar garnish, a seat back board, a roof trim, an instrument panel, a console box, a dashboard, and a deck trim. In addition, it can also be used for various types of transfer means or transport means such as railroad vehicles, ships, and airplanes. Moreover, in the building-related field, it is suitable as interior materials, exterior materials and structural materials of various types of buildings. For example, it is used as a door mounting material, a door structural material, a mounting material or a structural material of various types of furniture (e.g., desk, chair, shelf, or chest of drawers), etc.

[2] Method for Producing a Resin Molding

A method for producing a resin molding of the present invention includes a shaping step of shaping the substrate 11 and an extension part formation step of forming the extension part 12 by injection-molding. The shaping step is a step of shaping the substrate 11 to form a plate-like molding having a prescribed planar shape, and the extension part forming step is a step of injecting a resin against an end surface 11a of the shaped substrate 11, thereby extending the extension part 12 from the end surface 11a in the plate surface direction of the substrate 11.

The method of molding the substrates 11 is not particularly limited, but the substrate is usually molded by press-molding. Since the substrate 11 is provided with the extension part 12 by injecting a resin against its end surface 11a, the molding of the resin molding 1 is performed by insert-molding. As a preliminary molding that will become the substrate 11 to be inserted into a mold, there can be used a web formed by mixing reinforcing fibers such as plant fibers with the first thermoplastic resin. In the formation of the web, the first thermoplastic resin is mixed in the form of fiber, powder, or the like, and mixing in the form of fiber is preferred because this makes the web formation easier.

The substrate 11 can be molded by heating a preliminary molding, such as a web, formed as described above to a prescribed temperature according to the melting point of the first thermoplastic resin, etc., then inserting it into a mold having a cavity with a prescribed shape, and subsequently pressurizing it to shape. Moreover, the substrate 11 and the extension part 12 can be molded simultaneously by pressurizing the preliminary molding and, at the same time, injecting the second thermoplastic resin toward a surface of the substrate 11 that will become an end surface 11a in such a manner that the resin can flow, and then cooling. When the preliminary molding is heated and pressurized, the interlacing points of the reinforcing fibers are bound with the molten first thermoplastic resin, and thus the substrate 11 reinforced by fibers can be yielded.

Figure 5:
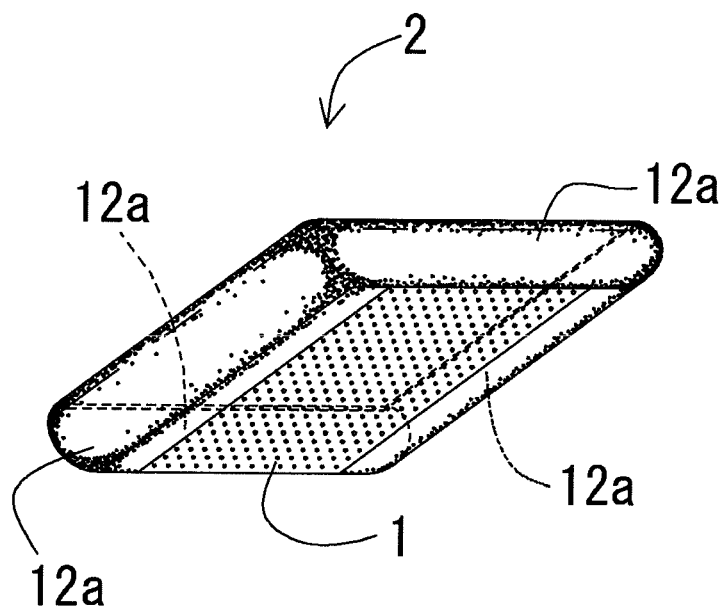
FIG. 5 is a schematic perspective view of one example of the resin molding of the present invention.
Figure 6:
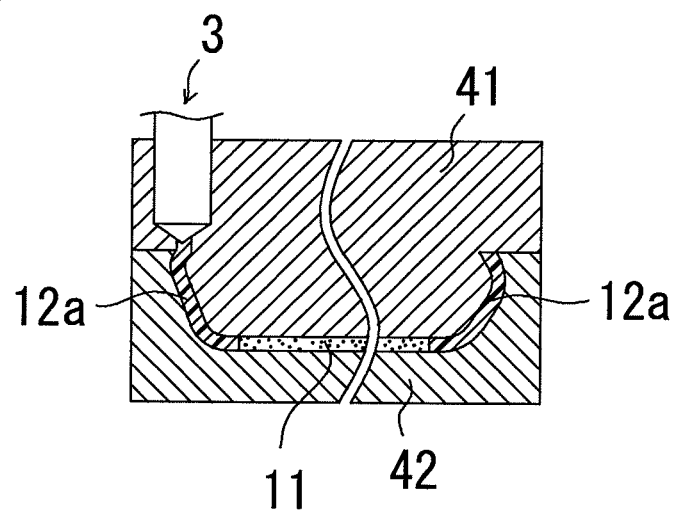
FIG. 6 is a schematic cross-sectional view illustrating the production of the resin molding of the present invention.

Moreover, when the resin molding 1 is an interior material for vehicles or the like, by using a prescribed mold when injecting the second thermoplastic resin such that the resin flows toward a surface that will become an end surface 11a of the substrate 11 and thereby molding the extension part 12, it is possible to simultaneously mold a plate-like part further extending from the extension part 12, thereby forming the aforementioned aesthetic under shape part 12a (see FIG. 3) [see FIG. 6 illustrating an embodiment in which a resin molding is molded using a mold composed of a stationary mold (core mold) 41 equipped with an injection-molding machine 3 and a mobile mold (cavity mold) 42, and FIG. 5 illustrating a resin molding 2 obtained by releasing from the mold after thus molding] and it is also possible to form a rib 14 at the same time.

It is noted that the foregoing examples have been provided merely for the purpose of explanation and are in no way to be construed as limiting of the present invention. While the present invention has been described with reference to exemplary embodiments, it is understood that the words that have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The resin molding of the present invention and a method for producing the same can be used in a wide variety of product fields such as vehicle-related fields and building-related fields. Especially, they are useful in the technical field of interior materials for vehicles, such as door trims, roof trims and floor trims.

What is claimed is:

1. A resin molding comprising:
   a planar substrate comprising reinforcing fibers and a first thermoplastic resin binding the reinforcing fibers to each other; and
   an extension part that is constituted of an injection-molded member and is extended from an end surface of the substrate along the plate face direction of the substrate,
   wherein the substrate and the extension part are connected at a connection part flush to each other on, of one surface and an other surface of the connection part of the substrate and the extension part, the side of the one surface,
   wherein the extension part is equipped with a planar part further extending from the extension part,
   wherein the planar part constitutes an outer edge part of the resin molding and forms a shape involute toward the side of the other surface,
   wherein the resin molding has a rib that is arranged on the side of the other surface from the substrate to the planar part and stands approximately perpendicularly to the plate face direction of the substrate,
   wherein the rib is a part of the injection-molded member,
   wherein the end surface of the substrate and an end surface of the extension part are connected to each another,
   wherein an entirety of a surface of the substrate, the extension part, and the planar part, on the one surface side of the connection part, form a single surface constituting a design surface of a vehicle interior material, and
   wherein the reinforcing fibers are arranged within the substrate, and the reinforcing fibers are absent from the extension part and the planar part.

2. The resin molding according to claim 1, wherein the reinforcing fibers are plant fibers.

3. The resin molding according to claim 1, wherein the first thermoplastic resin and a second thermoplastic resin contained in the injection-molded member are the same type of thermoplastic resin.

4. A method for producing a resin molding according to claim 1, comprising:
 shaping the substrate; and
 forming the extension part by injection-molding.

5. The resin molding according to claim 3, wherein with the same type of thermoplastic resin, the main monomers that constitute the first thermoplastic resin and the second thermoplastic resin are the same.

6. The resin molding according to claim 1, wherein the end surface of the substrate is a terminal end surface.

7. The resin molding according to claim 1, wherein the planar substrate is a press-molded substrate.

* * * * *